United States Patent
Nagasawa et al.

(10) Patent No.: US 7,830,034 B2
(45) Date of Patent: Nov. 9, 2010

(54) CONNECTING STRUCTURE OF COMPONENT IN WIRE HARNESS

(75) Inventors: Kazumi Nagasawa, Kosai (JP); Takao Ota, Kosai (JP); Tsuyoshi Uchikura, Kosai (JP); Masato Kume, Toyota (JP); Tatsumi Tashiro, Toyota (JP)

(73) Assignee: Yazaki Corporation, Tokyo (JP)

( * ) Notice: Subject to any disclaimer, the term of this patent is extended or adjusted under 35 U.S.C. 154(b) by 142 days.

(21) Appl. No.: 12/207,226

(22) Filed: Sep. 9, 2008

(65) Prior Publication Data

US 2009/0068900 A1 Mar. 12, 2009

(30) Foreign Application Priority Data

Sep. 10, 2007 (JP) .............................. 2007-233651

(51) Int. Cl.
*B60L 1/16* (2006.01)
(52) U.S. Cl. ..................... 307/10.8; 307/9.1; 307/10.1
(58) Field of Classification Search ............... 307/10.8
See application file for complete search history.

(56) References Cited

U.S. PATENT DOCUMENTS 6,262,537 B1 * 7/2001 Matsumoto ................. 315/82
7,075,237 B2 * 7/2006 Sato et al. ................... 315/82

FOREIGN PATENT DOCUMENTS

JP        2001-1833 A      1/2001
JP        2001-310690 A   11/2001

* cited by examiner

*Primary Examiner*—Jared J Fureman
*Assistant Examiner*—Hal I Kaplan
(74) *Attorney, Agent, or Firm*—Sughrue Mion, PLLC

(57) ABSTRACT

A connecting structure of a component in a wire harness includes a relay box connected to a circuit at a power supply side and a circuit at a headlamp side, and a control unit connected to the relay box. A connecting section of the relay box is configured to be selectively connected to either one of a headlamp control device and a relay for turning on and off low beam or high beam. Both of the headlamp control device and the relay have terminals of the same shape.

2 Claims, 3 Drawing Sheets

CONNECTING STRUCTURE OF COMPONENT IN WIRE HARNESS

BACKGROUND

The present invention relates to a connecting structure of a component in a wire harness for selectively assembling a DRL (Daytime Running Light) device to a relay box in a wire harness which is mounted on an automobile.

FIG. 5 shows an example of a related connecting structure of a component in an on-vehicle wire harness.

This on-vehicle wire harness 51 includes a DRL system for lighting headlamps of an automobile at daytime running, for example, in Europe, and is constructed by connecting a secondary relay box 53 for DRL to a primary relay box 52 of the wire harness by a circuit (electric wire). In this specification, the wire harness 51 is described as including both the relay boxes 52 and 53.

In FIG. 5, a circuit from a battery 54 and an ECU (Electronic Control Unit) 57 at a side of a headlamp switch 55 are connected to the primary relay box 52. The secondary relay box 53, and headlamps 58, 60 of low beam are connected to the primary relay box 52 through respective circuits. Further, one of circuits 62 of headlamps 59, 61 of high beam is also connected to the primary relay box 52. The other circuit 63 of the headlamps 59, 61 of the high beam is connected to the secondary relay box 53. The wire harness circuit 51 in FIG. 5 is applied to a case where the headlamps 58 to 61 of four lamp type are employed.

In FIG. 5, denoted by reference numeral 64 is a main fuse at a battery side, 56 is a dimmer switch (a switch for switching between the low beam and the high beam) at a side of the ECU, 65 is a terminal for the headlamps, 66 is a terminal for the DRL, 67 is a relay for the headlamps which is a component in the primary relay box, 68 is a fuse, 69 is a relay for the DRL, 70, 71 are relays for the DRL which are components in the secondary relay box, and 72 is a resistor for the DRL (dimming) which is connected to the secondary relay box 53.

As the on-vehicle wire harness of the type as shown in FIG. 5, a similar structure is disclosed in Patent Document 1, for example. In Patent Document 1, an ignition switch and an output part of engine rotation signals are connected to the DRL control unit (ECU).

FIG. 6 shows an example of a relay box in a related on-vehicle wire harness (Reference should be made to Patent Document 2).

This relay box 81 is arranged at a side of an instrument panel of an automobile. For the purpose of mounting a control unit (not shown) which is a component for DRL together with a relay 82 for supplying power to headlamps, the control unit for the DRL is formed in a substantially same outer shape as the relay 82, and connected to a terminal 84 in a relay connecting cavity (connecting section) 83 in the relay box 81.

The control unit (not shown) for the DRL includes an FET (Field Effect Transistor) acting as a switching element, an IC and a condenser which are mounted on a circuit board and covered with a resin body, having terminals projected from the resin body.

[Patent Document 1] JP-A-2001-1833 (FIG. 1 and FIG. 2)
[Patent Document 2] JP-A-2001-310690 (FIG. 1)

However, in the above described related connecting structure of the component in the on-vehicle wire harness in FIG. 5, the secondary relay box 53, the relays 70, 71, the fuses, connecting circuits (electric wires) 73 and so on have been necessary for achieving the DRL function, which incurs upsizing and complication of the structure. Moreover, the wire harness for the DRL is not compatible with the wire harness in which the DRL system is not required, and hence, two types of the wire harnesses, one for a case having the DRL function, and the other for a case not having the DRL function, are required. Therefore, there has been a problem that high cost is required in production, maintenance, and so on of the wire harnesses.

In the above described related structure of the wire harness including the relay box 81, as shown in FIG. 6, the wire harness can be made compact, because the relay 82 and the DRL device (not shown) which is the control unit for the DRL having the substantially same outer shape as the relay 82 are installed in the relay box 81 at the same time. However, in this structure too, two types of the wire harnesses, specifically, in case where the DRL device is used, and in case where the DRL device is not used, are required. Moreover, in case where a common relay box is used for both the cases, a space for the relay and a space for the DRL device are necessary, because the relay and the DRL device are separately arranged in the relay box. Therefore, there has been such anxiety that the relay box may become large-sized, and the circuit inside the relay box may become complicated.

SUMMARY

In view of the above described drawbacks, it is an object of the invention to provide a connecting structure of a components in a wire harness in which cost for production and maintenance of the wire harness can be reduced irrespective of whether the DRL device for lighting headlamps of an automobile in daytime is used or not used, a relay box can be made compact, and further, a circuit structure inside the relay box can be simplified and become low cost.

In order to attain the above described object, there is provided a connecting structure of a component in a wire harness, comprising:

a relay box connected to a circuit at a power supply side and a circuit at a headlamp side; and a control unit connected to the relay box, wherein a connecting section of the relay box is configured to be selectively connected to either one of a headlamp control device and a relay for turning on and off low beam or high beam, and wherein both of the headlamp control device and the relay have terminals of the same shape.

According to the above described structure, the wire harness in which the headlamp control device is used, and the wire harness in which the relay for turning on and off the low or high beam is used are commonly used in all the parts, except the headlamp control device and the relay for turning on and off the low or high beam. Moreover, unlike the related example, the headlamp control device and the relay for turning on and off the low or high beam are not separately arranged in the relay box. Therefore, a space for arranging the headlamp control device and a space for arranging the relay for turning on and off the low or high beam are unitized and space-saving is achieved. As the results, the relay box is made compact and a circuit in the relay box is simplified.

Also, all the parts of the wire harness can be commonly used, excluding the headlamp control device for daytime lighting and the relay for turning on and off the low or high beam which is not for the daytime lighting, and hence, cost required for production and maintenance of the wire harness is reduced. Moreover, the space for arranging the headlamp control device and the space for arranging the relay for turning on and off the low or high beam are unitized and space-saving is achieved, because the headlamp control device and the relay for turning on and off the low or high beam are not separately arranged in the relay box, unlike the related example. As the results, the relay box is made compact and a circuit in the relay box is simplified. In this manner, low cost and light weight of the wire harness can be achieved, and reliability of electrical connection in the wire harness is enhanced.

Preferably, either one of a terminal of the headlamp control device and a dummy terminal of the relay is selectively connected to a headlamp control circuit of the control unit.

According to the above described structure, the terminal of the relay for turning on and off the low or high beam is connected to the terminal of the headlamp control circuit of the control unit, as the dummy, whereby it is possible to avoid risks such as exposure of the terminal of the headlamp control circuit, a short circuit caused by the exposure, and so on.

Also, the terminal of the relay for turning on and off the low or high beam is connected to the terminal of the headlamp control circuit of the control unit, as the dummy, whereby it is possible to avoid risks such as exposure of the terminal of the headlamp control circuit, a short circuit caused by the exposure, and so on. As the results, reliability of the electrical connection in the wire harness is enhanced.

BRIEF DESCRIPTION OF THE DRAWINGS

The above objects and advantages of the present invention will become more apparent by describing in detail preferred exemplary embodiments thereof with reference to the accompanying drawings, wherein:

FIG. 6 is a plan view showing an example of a relay which is a part of the related on-vehicle wire harness, and a perspective view of the relay in a state mounted on a vehicle.

DETAILED DESCRIPTION OF EXEMPLARY EMBODIMENTS

Figure 1:
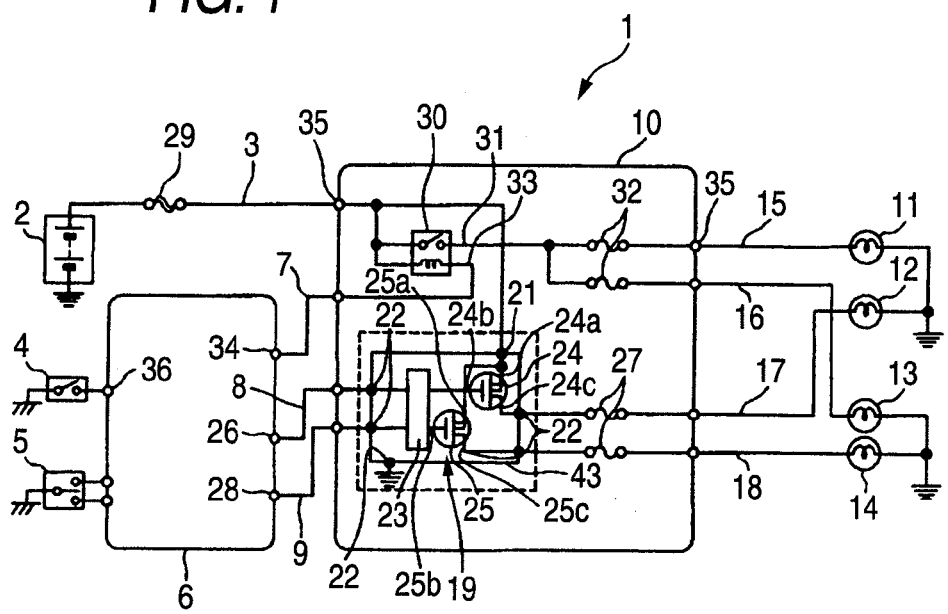
FIG. 1 is a circuit diagram showing a connecting structure of a component in an on-vehicle wire harness in an embodiment according to the invention.

FIGS. 1 to 4 show a connecting structure of a component in an on-vehicle wire harness in an embodiment according to the invention.

This on-vehicle wire harness 1 includes a circuit (electric wire) 3 connected to a battery (power supply) 2, an ECU (Electronic Control Unit or a control unit) 6 connected to a headlamp switch 4 and a dimmer switch 5, a relay box (electric junction box) 10 connected to the circuit 3 and the circuits (electric wires) 7 to 9, and circuits 15 to 18 connecting the relay box 10 to headlamps 11 to 14. The circuits 7 to 9 are connected to the ECU 6. A DRL device (headlamp control device) 19 for DRL (Daytime Running Light) (FIGS. 1 and 2) and a relay 20 for a case not using the DRL (FIGS. 3 and 4) can be selectively connected to the same connecting section 43 in the relay box 10. In this manner, common use of the wire harness containing the relay box 10 (parts of the wire harness except the DRL device 19 and the relay 20) between the case having the DRL function and the case not having the DRL function can be achieved.

Figure 2:
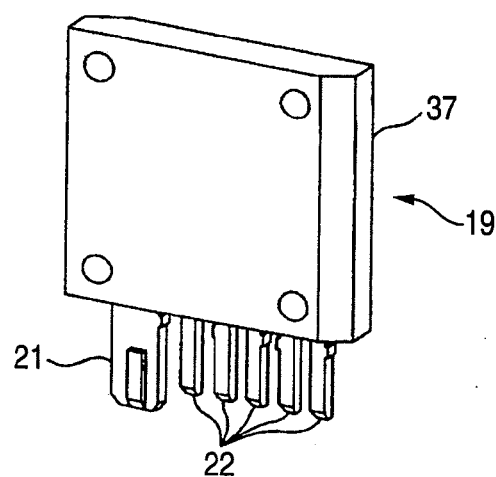
FIG. 2 is a perspective view showing a DRL device as a component to be used in the connecting structure of the component in the on-vehicle wire harness in the embodiment in FIG. 1.

FIG. 1 is a circuit diagram of the wire harness 1 in a state where the DRL device 19 is mounted on the relay box 10. The DRL device 19 is also called as a DRL module, and includes, as shown in FIG. 2, one male terminal 21 in a shape of a wide and long plate for inputting power supply, and five male terminals 22 in a shape of a narrow and short plate, specifically, two for inputting, two for outputting, and one for grounding. These six terminals 21, 22 in total are formed in the same size and shape, and at the same pitch, as the terminals 21', 22' of the relay 20 (See FIG. 4) which is adapted to be mounted on the wire harness 1' for the case not having the DRL function in FIG. 3.

As shown in FIG. 1, the DRL device 19 in FIG. 2 includes a control section 23, and two FETs (Field Effect Transistor) 24, 25, which are switching elements, in a case 37 formed of insulating resin. The male terminals 21, 22 which are projected from the case 37 are inserted into a connector (not shown) containing respective female terminals, which is a connecting section 43 in the relay box 10 in FIG. 1.

A source circuit 24a of the first FET 24 at an upper side in FIG. 1 is connected to the terminal 21 for inputting the power supply, and a gate circuit 24b of the first FET 24 is connected to the control section 23. A drain side circuit 24c of the first FET 24 is connected to the terminal 22 to be connected to the circuit 17 to the right side headlamp 12 of high beam by way of a fuse 27.

Moreover, a source circuit 25a of the second FET 25 at a lower side in FIG. 1 is connected to the source circuit 24a of the first FET 24, and a gate circuit 25b of the second FET 25 is connected to the control section 23. A drain side circuit 25c of the second FET 25 is connected to the terminal 22 to be connected to the circuit 18 to the left side headlamp 14 of high beam by way of a fuse 27.

The battery 2 is connected to a relay 30 for the headlamps inside the relay box 10 by way of a fuse 29, and a circuit 31 at a switch side of the relay 30 for the headlamps is connected to the right side headlamp 11 of low beam and the left side headlamp 13 of low beam by way of fuses 32 and the circuits 15, 16. A coil side circuit 33 of the relay 30 for the headlamps 30 is connected to the ECU 6 by a terminal 34. Numeral 35 in FIG. 1 represents terminals interconnecting the relay box 10 and the respective circuits. The ECU 6 is connected to the headlamp switch 4 and the dimmer switch 5 by respective terminals.

Figure 3:
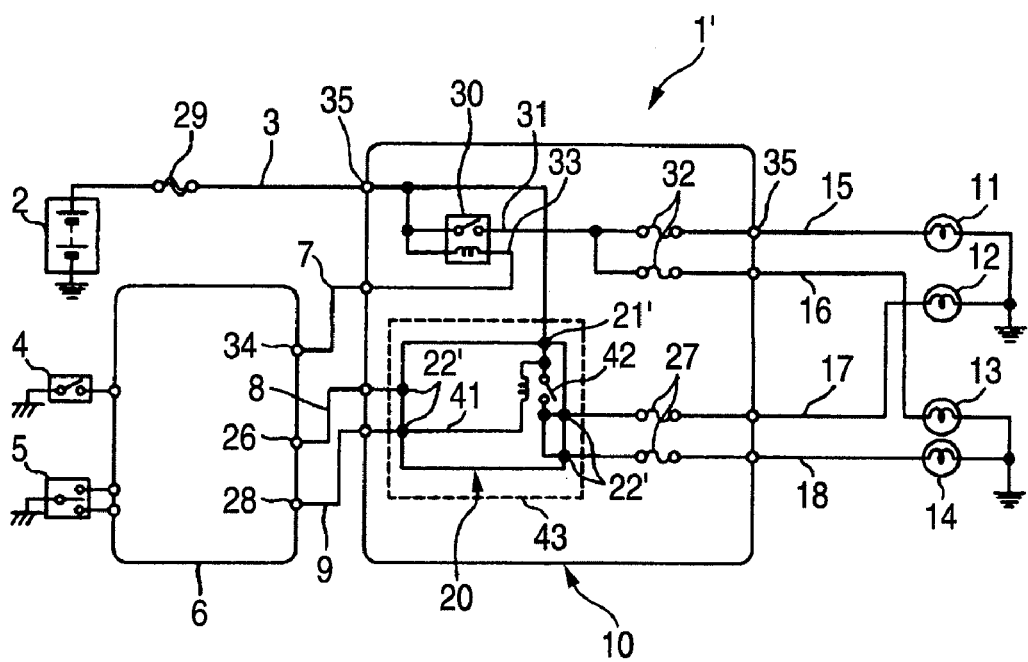
FIG. 3 is a circuit diagram showing the connecting structure of the component in the on-vehicle wire harness in which the DRL device is substituted by a relay.
Figure 4:
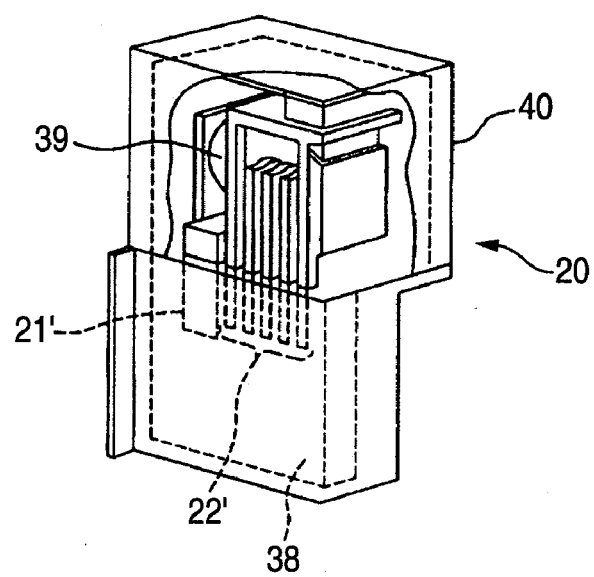
FIG. 4 is a perspective view showing the relay as the component to be used in the connecting structure of the component in the on-vehicle wire harness in the embodiment in FIG. 3.

FIG. 3 shows the wire harness circuit 1' in a state where the DRL device 19 in FIG. 2 is not mounted to the connecting section 43 of the relay box 10 of the wire harness circuit 1 in FIG. 1, but the relay 20 for the case not having the DRL function in FIG. 4 is mounted thereto.

The relay 20 in FIG. 4 has the six terminals 21', 22' having the same shape as in the DRL device 19, as described above, in a space 38 for inserting the mating terminals in a case 40 which is formed of insulating resin. The terminals 21', 22' are connected to a coil 39, contacts, and circuits (not shown) inside the case 40. A connector (not shown) containing the female terminals, which is the connecting section 43 at the side of the relay box 10, is inserted into and engaged with the space 38 for inserting the mating terminals.

As shown in FIG. 3, the terminal 21' having a large width of the relay 20 for the case not having the DRL function is connected to the power supply circuit 3 from the battery 2, in the relay box 10. The other terminals 22' having a small width are respectively connected to the circuit 8 connected to a DRL terminal 26 of the ECU 6, the circuit 9 connected to a dimmer terminal 28 of the ECU 6, and the circuits 17, 18 connected to the right and left headlamps 12, 14 of the high beam.

The terminal 22' connected to the circuit 8 which is connected to the DRL terminal 26 is not connected to the circuit in the relay, but becomes a dummy thereby to prevent a risk such as a short circuit when the female terminal (not shown) at a side of the circuit 8 is exposed. A circuit 41 at a coil side of the relay 20 is connected to the dimmer terminal 28 of the ECU 6 which is connected to the dimmer switch 5. By operating the dimmer switch 5, a contact 42 of the relay 20 is turned on or off, whereby the headlamps 12, 14 of the high beam and the headlamps 11, 13 of the low beam are lit on or out.

In FIG. 3, the terminal 22' for grounding is not required or omitted in the drawing. The wire harness circuit 1' in FIG. 3 is the same as the wire harness circuit 1 in FIG. 1, except the relay 20 for the case not having the DRL function. Therefore, the same constituent elements as in FIG. 1 are denoted by the same reference numerals, and description of them is omitted.

Figure 5:
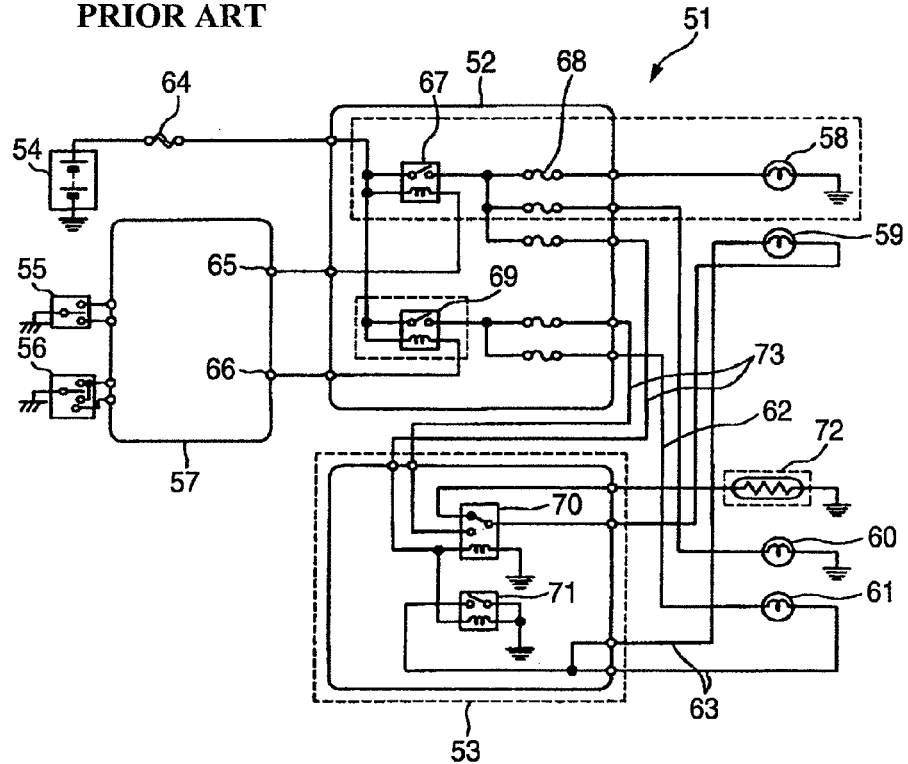

According to the structure in the above described embodiment, it is possible to commonly use the other components except the DRL device 19 for the case having the DRL function and the relay 20 for the case not having the DRL function, without adding relays, fuses, electric wires (circuits), etc., as in the related example in FIG. 5.

Figure 6:
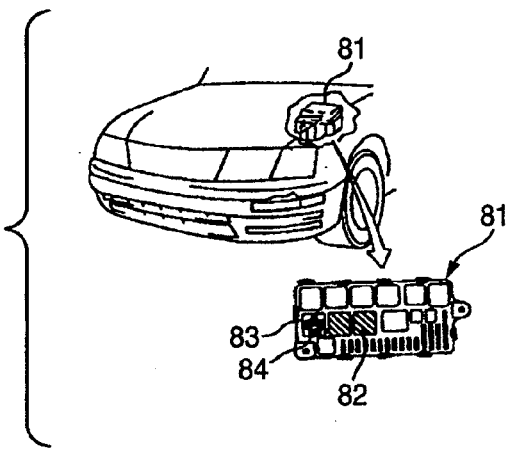
FIG. 6 is a circuit diagram showing an example of a related connecting structure of a component in an on-vehicle wire harness.

Moreover, unlike the related example in FIG. 6, the relay (the relay 20 for the case not having the DRL function) and the control device (the DRL device 19 for the case having the DRL function) need not be separately arranged in the relay box. Therefore, a space for arranging the relay 20 and a space for arranging the DRL device 19 are unitized and space-saving is achieved. As the results, the relay box 10 is made compact and the circuits in the relay box are simplified.

Moreover, in the above described embodiment, the wire harness circuits 1, 1' in case where the headlamps 11 to 14 of four lamp type are employed have been described. However, in case where the headlamps of two lamp type in which bulbs of high beam and low beam are combined are employed too, the principle of operation is the same as in the above described embodiment.

Further, in the above described embodiment, an amount of light is regulated (dimmed) by controlling the right and left headlamps 12 and 14 of the high beam by the DRL device 19. However, it is also possible to regulate the amount of light by controlling the headlamps 11 and 13 of the low beam or the headlamps 11 to 14 of both the low beam and the high beam by the DRL device 19.

In the circuits of FIG. 1 and FIG. 3, the headlamps 11, 13 of the low beam are lit in association with an ignition key. However, it is also possible to operate the DRL device 19 according to rotation number of an engine (for example, to light out at a time of idling and to light up at a time starting), as described in Patent Document 1.

Still further, in place of the relay 20 in FIG. 4, the DRL device 19 in which the DRL function is eliminated (only the relay function is remained) can be also used. In this case, the structure inside the relay box 10 becomes further compact and the space-saving is achieved, because the outer shape of the DRL device 19 is smaller than that of the relay 20.

Still further, the terminals 21, 22 of the DRL device 19 in FIG. 2 and the terminals 21', 22' of the relay 20 in FIG. 4 may be female terminals instead of the male terminals. In this case, the terminals (not shown) in the relay box 10 must be the male terminals.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japan Patent Application No. 2007-233661 filed on Sep. 10, 2007, the contents of which are incorporated herein for reference.

What is claimed is:

1. A connecting structure of a component in a wire harness, comprising:
   a relay box connected to a circuit at a power supply side and a circuit at a headlamp side; and
   a control unit connected to the relay box,
   wherein a connecting section of the relay box is configured to be selectively connected to either one of a headlamp control device and a relay for turning on and off low beam or high beam; and
   wherein both of the headlamp control device and the relay have terminals of the same shape.

2. The connecting structure according to claim 1, wherein either one of a terminal of the headlamp control device and a dummy terminal of the relay is selectively connected to a headlamp control circuit of the control unit.

\* \* \* \* \*